(12) United States Patent
Milette (10) Patent No.: US 7,699,533 B2
(45) Date of Patent: Apr. 20, 2010

(54) BACK-TO-BACK RECEPTACLE

(75) Inventor: Luc Milette, Montréal (CA)

(73) Assignee: Belden CDT (Canada) Inc., Saint-Laurent (CA)

( * ) Notice: Subject to any disclaimer, the term of this patent is extended or adjusted under 35 U.S.C. 154(b) by 0 days.

(21) Appl. No.: 11/779,335

(22) Filed: Jul. 18, 2007

(65) Prior Publication Data

US 2008/0013890 A1 Jan. 17, 2008

Related U.S. Application Data

(62) Division of application No. 10/945,935, filed on Sep. 22, 2004, now Pat. No. 7,258,493.

(60) Provisional application No. 60/504,189, filed on Sep. 22, 2003.

(30) Foreign Application Priority Data

Sep. 22, 2003 (CA) .................................... 2441872

(51) Int. Cl.
G02B 6/38 (2006.01)
G02B 6/36 (2006.01)
G02B 6/42 (2006.01)

(52) U.S. Cl. .............................. 385/75; 385/53; 385/92

(58) Field of Classification Search .................. 385/75, 385/53, 92
See application file for complete search history.

(56) References Cited

U.S. PATENT DOCUMENTS

| 4,070,080 | A | | 1/1978 | Eshleman et al. | |
|---|---|---|---|---|---|
| 4,140,367 | A | * | 2/1979 | Makuch et al. | ................ 385/59 |
| 4,245,875 | A | | 1/1981 | Shaffer et al. | |
| 4,339,172 | A | * | 7/1982 | Leather | ....................... 385/70 |
| 4,386,333 | A | | 5/1983 | Dillan | |
| 4,403,824 | A | | 9/1983 | Scott | |
| 4,764,129 | A | | 8/1988 | Jones et al. | |
| 4,840,451 | A | | 6/1989 | Sampson et al. | |
| 5,016,968 | A | * | 5/1991 | Hammond et al. | ............ 385/78 |
| 5,073,042 | A | | 12/1991 | Mulholland et al. | |
| 5,082,344 | A | * | 1/1992 | Mulholland et al. | ........... 385/60 |
| 5,101,463 | A | | 3/1992 | Cubukciyan et al. | |
| 5,125,056 | A | * | 6/1992 | Hughes et al. | ................. 385/59 |
| 5,142,597 | A | * | 8/1992 | Mulholland et al. | ........... 385/56 |

(Continued)

*Primary Examiner*—K. Cyrus Kianni
(74) *Attorney, Agent, or Firm*—Goudreau Gage Dubuc (57) ABSTRACT

A back-to-back receptacle and system for providing selective interconnection between a pair of optic fibres. The system comprises a receptacle comprising a pair of back-to-back receptacle sockets, with at least a first of the sockets configured to one of a plurality of predefined receptacle keying geometries, a first connector plug terminating the first optic fibre, the plug adapted for insertion into the first receptacle socket, the plug configured to one of a plurality of predefined connector keying geometries and a second connector plug terminating the second optic fibre, the plug adapted for insertion into a second of the back-to-back receptacle sockets. At least one of the predefined connector keying geometries matches at least one of the predefined receptacle keying geometries. When the receptacle keying geometry of the first receptacle socket corresponds to the connector keying geometry of the first plug and optionally the receptacle geometry of the second of the back-to-back receptacle sockets corresponds to the connector keying geometry of the second plug, the first plug can be inserted in the first socket and the second plug can be inserted in the second socket bringing the first optic fibre into axial alignment with the second optic fibre.

17 Claims, 11 Drawing Sheets

U.S. PATENT DOCUMENTS

| | | | |
|---|---|---|---|
| 5,166,995 A * | 11/1992 | Briggs et al. | 385/58 |
| 5,231,685 A * | 7/1993 | Hanzawa et al. | 385/84 |
| 5,233,675 A | 8/1993 | Cannetti | |
| 5,297,227 A | 3/1994 | Brown et al. | |
| 5,318,463 A | 6/1994 | Broschard, III et al. | |
| 5,321,784 A * | 6/1994 | Cubukciyan et al. | 385/78 |
| 5,386,486 A * | 1/1995 | Fan et al. | 385/59 |
| 5,420,951 A | 5/1995 | Marazzi et al. | |
| 5,481,634 A | 1/1996 | Anderson et al. | |
| 5,561,727 A * | 10/1996 | Akita et al. | 385/88 |
| 5,577,145 A | 11/1996 | Musk | |
| 5,579,425 A | 11/1996 | Lampert et al. | |
| 5,682,450 A * | 10/1997 | Patterson et al. | 385/65 |
| 5,682,451 A | 10/1997 | Lee et al. | |
| 5,685,727 A | 11/1997 | Cairns | |
| 5,732,174 A | 3/1998 | Carpenter et al. | |
| 5,734,770 A * | 3/1998 | Carpenter et al. | 385/72 |
| 5,738,535 A | 4/1998 | Cairns | |
| 5,960,137 A * | 9/1999 | Noll | 385/53 |
| 6,017,154 A | 1/2000 | Carlisle et al. | |
| 6,017,227 A | 1/2000 | Cairns et al. | |
| 6,024,498 A | 2/2000 | Carlisle et al. | |
| 6,076,974 A | 6/2000 | Carlisle et al. | |
| RE37,080 E | 3/2001 | Stephenson et al. | |
| 6,305,849 B1 | 10/2001 | Roehrs et al. | |
| 6,332,787 B1 | 12/2001 | Barlow et al. | |
| 6,386,766 B1 | 5/2002 | Lee | |
| 6,419,400 B1 | 7/2002 | Wiltjer et al. | |
| 6,428,215 B1 | 8/2002 | Nault | |
| 6,719,461 B2 | 4/2004 | Cull | |
| 6,736,545 B2 | 5/2004 | Cairns et al. | |
| 6,769,813 B2 | 8/2004 | Cheng | |
| 6,859,604 B2 | 2/2005 | Marrs | |
| 6,916,120 B2 | 7/2005 | Zimmel et al. | |
| 7,040,909 B2 | 5/2006 | Cairns | |
| 2002/0126960 A1 | 9/2002 | Gurreri | |
| 2002/0131722 A1 | 9/2002 | Lampert et al. | |
| 2003/0077045 A1 | 4/2003 | Fleenor et al. | |
| 2004/0101251 A1 * | 5/2004 | Rahrig et al. | 385/59 |
| 2004/0151464 A1 | 8/2004 | Marrs | |
| 2004/0161203 A1 | 8/2004 | Cull | |
| 2004/0165833 A1 | 8/2004 | Betker et al. | |
| 2004/0264877 A1 | 12/2004 | Makhlin et al. | |
| 2005/0084215 A1 | 4/2005 | Grzegorzewska et al. | |
| 2007/0160327 A1 * | 7/2007 | Lewallen et al. | 385/53 |
| 2008/0131055 A1 * | 6/2008 | Parkman et al. | 385/58 |
| 2008/0145006 A1 * | 6/2008 | Ice | 385/93 |

* cited by examiner

FIG_1

FIG_2

FIG_3

FIG_4

FIG_5A

FIG_5B

FIG_6

FIG_7

FIG_8

FIG_9

FIG_16

FIG_17

FIG_18

FIG_19A

BACK-TO-BACK RECEPTACLE

CROSS REFERENCE TO RELATED APPLICATIONS

The present application is a divisional application of U.S. patent application Ser. No. 10/945,935, filed Sep. 22, 2004, now U.S. Pat. No. 7,258,493, which in turn claims the benefit of a commonly assigned provisional application entitled "Keyed Fibre Optic Connector", which was filed on Sep. 22, 2003 and assigned Ser. No. 60/504,189. The entire contents of the foregoing applications are hereby incorporated by reference.

FIELD OF THE INVENTION

The present invention relates to a back-to-back receptacle. In particular, the present invention relates to a receptacle and system using an interlocking connector and receptacle pair for fibre optic cables with a geometric keying system moulded into the interface thereby preventing connectors with a first key from being interconnected via a receptacle having a differing key.

BACKGROUND OF THE INVENTION

Optical fibres terminated by connectors and the receptacles which are adapted to received these connectors are an important part of virtually any fibre optic communications system. For example, such connectors and receptacles may be used to interconnect fibre segments to create longer lengths, to connect optic fibre to active or passive devices, etc. However, in some cases, for example for security reasons or in order to better manage a telecommunications network, it is desired to physically limit the insertion of a connector plug into a particular receptacle socket, and as a result prevent the transmission of data via that connector plug and receptacle socket.

The prior art reveals a variety of systems for preventing a connector plug from being inserted into a receptacle socket. One of these prior art systems comprises at least one tab arranged at a certain position on the connector plug, each of which is adapted for insertion into a corresponding tab receiving indentation moulded in the receptacle socket. In the absence of such a hollow the tab buts against the opening of the receptacle socket, thereby preventing the connector plug from being completely inserted into the receptacle socket, thereby preventing the connector plug from being correctly interconnected with the receptacle socket. One drawback of these prior art designs is that that the tab, being typically moulded into the plastic connector plug housing, can be easily removed by filing or using a sharp blade or the like. Another drawback is that such prior art designs only allow two types of connector plugs to be differentiated between: connector plugs with a tab and connector plugs without a tab.

The prior art also reveals keying systems such as the US patent application published with the number 2002/0126960 A1 comprising a connector plug and receptacle socket. Interconnection of the connector plug and receptacle socket is limited to connector plug/receptacle socket pairs where a key within the receptacle socket mates with a corresponding key receiving slot in the connector plug. A connector plug with a key receiving slot in one position is unable to interconnect with receptacle sockets with a differently positioned key. As a result, by providing a number of differently positioned keys and key receiving slot a system of selective interconnection between connector plugs and receptacle sockets can be arrived at. These systems, however, are generally impractical in many fibre optic systems given the relatively small size of the connector plug and the receptacle socket.

SUMMARY OF THE INVENTION

In order to address the drawbacks of the prior art, there is provided a system for providing selective interconnection between a first optic fibre and a second optic fibre. The system comprises a receptacle comprising a pair of back-to-back receptacle sockets, each of the sockets configured to one of a plurality of predefined receptacle keying geometries, a first connector plug terminating the first optic fibre, the plug adapted for insertion into a first of the back-to-back receptacle sockets, the plug configured to one of a plurality of predefined connector keying geometries and a second connector plug terminating the second optic fibre, the plug adapted for insertion into a second of the back-to-back receptacle sockets, the plug configured to one of a plurality of predefined connector keying geometries. At least one of the predefined connector keying geometries matches at least one of the predefined receptacle keying geometries. When a receptacle keying geometry of the first receptacle socket corresponds to the connector keying geometry of the first plug and a receptacle keying geometry of the second socket corresponds to the connector keying geometry of the second plug, the first plug can be inserted in the first socket and the second plug can be inserted in the second socket bringing the first optic fibre into axial alignment with the second optic fibre.

In particular embodiment, each of the connector plugs comprises a cavity formed in a forward end thereof configured to one of the plurality of predefined connector keying geometries and a ferrule for stabilising a respective one of the optic fibres and each of the sockets comprises a raised ferrule receiving boss disposed on a rear wall thereof and configured to one of the plurality of predefined receptacle keying geometries, the boss comprising an opening adapted to receive one of the ferrules therein when the boss is inserted into the cavity, the openings defining a passageway there between.

There is also disclosed a receptacle for providing selective interconnection between first and second fibre optic cables, each cable comprising a connector plug having one of a plurality of predefined connector keying geometries. The receptacle comprises a pair of back-to-back receptacle sockets, each of the sockets having a shape corresponding to one of a plurality of predefined receptacle keying geometries. When each of the connector keying geometries corresponds to one of the predefined receptacle keying geometries and when the receptacle keying geometry of a first of the back-to-back receptacle sockets corresponds to the connector keying geometry of the connector plug of the first cable wherein the second cable can be inserted in the second socket and when the receptacle keying geometry of a second of the back-to-back receptacle socket corresponds to the connector keying geometry of the connector plug of the second cable, the connector plug of the first cable can be inserted in the first socket and the connector plug, thereby interconnecting the first and second cables.

DETAILED DESCRIPTION OF THE ILLUSTRATIVE EMBODIMENTS

Figure 1:
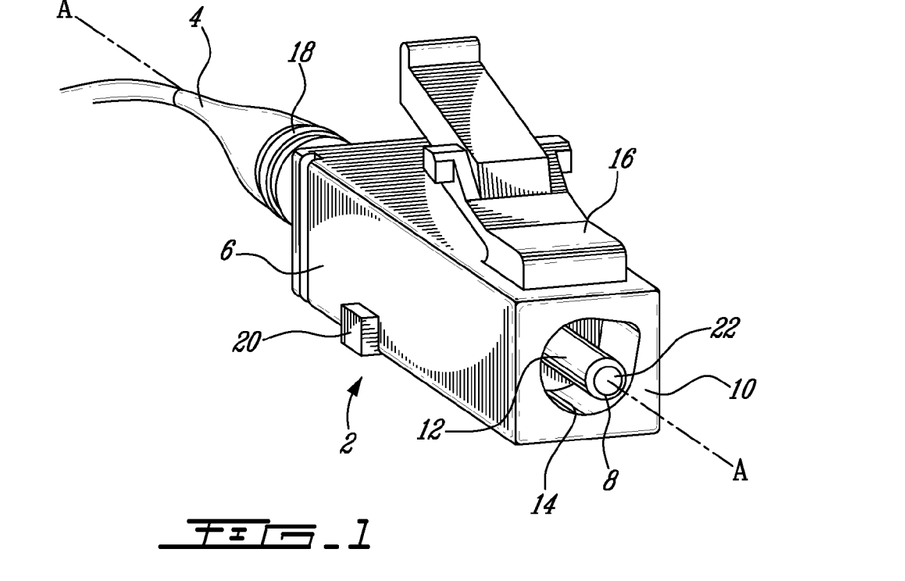
FIG. 1 is an orthogonal view of a connector in accordance with an illustrative embodiment of the present invention.

Referring now to FIG. 1, a fibre optic connector in accordance with an illustrative embodiment of the present invention will be described. The connector, generally referred to using the reference numeral 2, which serves to connect a fibre optic cable 4 to a receptacle (not shown) is disclosed. As illustrated, connector 2 forms part of a cable assembly with an LC type connector plug attached at one end. It should be noted that although the illustrative embodiment of the present invention is described in reference to LC type connectors, it is not intended to limit the invention to this type of connector. Accordingly, the present invention may also be used, for example, with LC, SC, FC, MU and other similar connectors having a ferrule guide and/or support.

Still referring to FIG. 1, the connector is comprised of a connector plug housing 6, fabricated from a suitable non-conductive material such as glass filled thermoplastic, through which the optic fibre 8 extends protruding from a forward end 10 thereof. The optic fibre 8 is held rigidly within a hollow ferrule 12, fabricated from a suitable stiff non-conductive material such as ceramics, which is in turn held in axial alignment within the plug housing 6, thus ensuring that the optical fibre is maintained in substantially axial alignment with the central axis A of the plug housing 6. Typically, ferrule 12 is held rigidly inside the plug housing 6, but may also be spring loaded allowing some movement of the ferrule 12, and thus the optic fibre 8, forward and backwards along the central axis A.

A cavity 14, also in axial alignment with the central axis A, is moulded or machined into the forward end 10 of the plug housing 6 with the optic fibre 8/ferrule assembly 12 being axially aligned therein. A flexible locking tab or latch 16 is attached to the outside of the plug housing 6 allowing the plug housing 6 to be removeably attached to a suitable receptacle (not shown). The join between optic fibre cable 4 and the plug housing 6 is protected by means of a flexible strain-relieving boot 18, typically manufactured from rubber, rubberised plastic or the like. A pair of raised tabs as in 20 may be moulded to the outside of the plug housing which, as will be seen below, mate with corresponding indentations in the receptacle (both not shown).

During fabrication, the optic fibre 8 is typically inserted through the ferrule 12 and bonded thereto with an appropriate adhesive or bonding technique. The ends of the optic fibre 8/ferrule 12 are then cut and polished according to a predefined geometry dictated to the standard being implemented. The polishing results in an exposed end 22 of the optic fibre 8 extending forward of the forward end 10 of the plug housing, thereby allowing light to propagate to and from the optic fibre 8.

Figure 2:
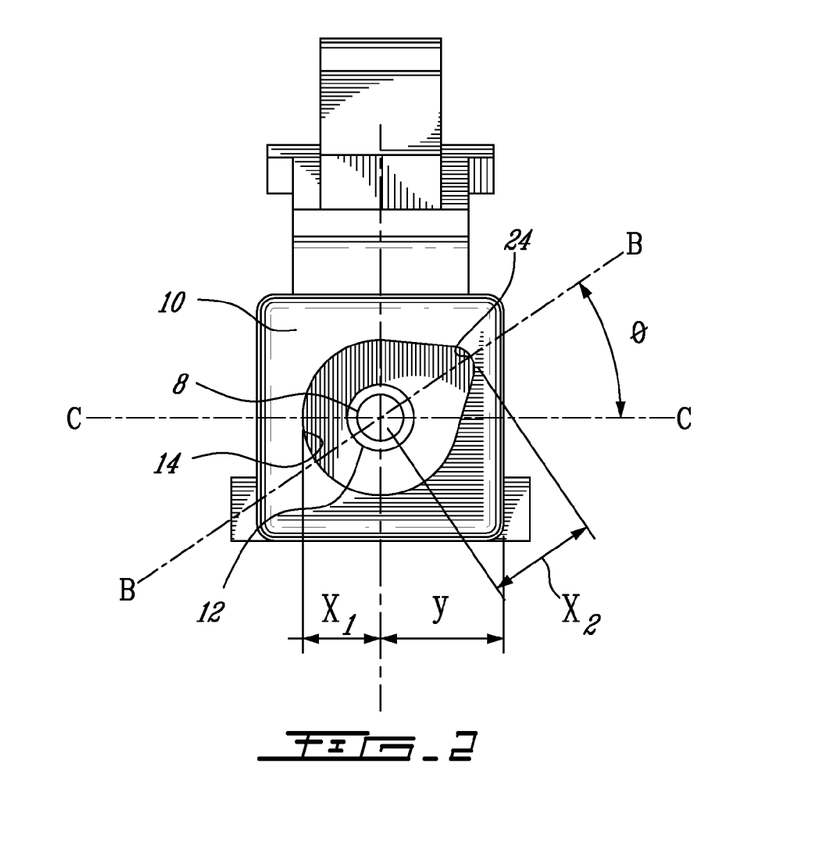
FIG. 2 is a front plan view of a connector in accordance with an illustrative embodiment of the present invention.

Referring now to FIG. 2, a first illustrative embodiment of a keying system in accordance with the present invention will be described in more detail. The cavity 14, through which the optic fibre 8/ferrule 12 assembly extends, is configured to one of a plurality of predefined connector keying geometries. The connector keying geometry is illustratively provided by a cavity having a cavity keying geometry having an oval or egg shaped cross section with a first generally circular concentric portion of radius $X_1$ and a keying portion 24 extending a distance of $X_2$ from the centre of the optic fibre 8, with $X_2$ being illustratively greater than radius $X_1$. As illustrated in FIG. 2, the cavity keying portion 24, for example a flute, notch or protuberance, is illustratively symmetric about an axis B, with axis B at a predetermined connector keying angle θ from the horizontal plane C. Of course, the maximum point of extension $X_2$ from the core of the optic fibre 8 must be chosen such that it is sufficiently less than distance y between the centre of the optic fibre 8 and the outer surface of the plug housing 6 to ensure that sufficient material remains between the cavity 14 and the outer surface of the plug housing 6 for all keying angles θ. The other dimensions of the cavity keying portion 24 such as the width and profile, are preferably selected such that the cavity keying portion 24 is difficult to modify, for example by removing the cavity keying portion 24 using a knife or the like in the case of a protuberance, or to modify without destroying the connector 2, thereby deterring the user from modifying the connector 2 for other purposes.

The cross section of the cavity keying portion 24 could alternatively be of a different shape, for example a square notch or concave depression in the side wall of the cavity 14, or could also be asymmetric. As will be seen below, the combination of the cavity keying portion 24 with the connector keying angle θ provides one embodiment for the connector portion of the keying system.

Figure 3:
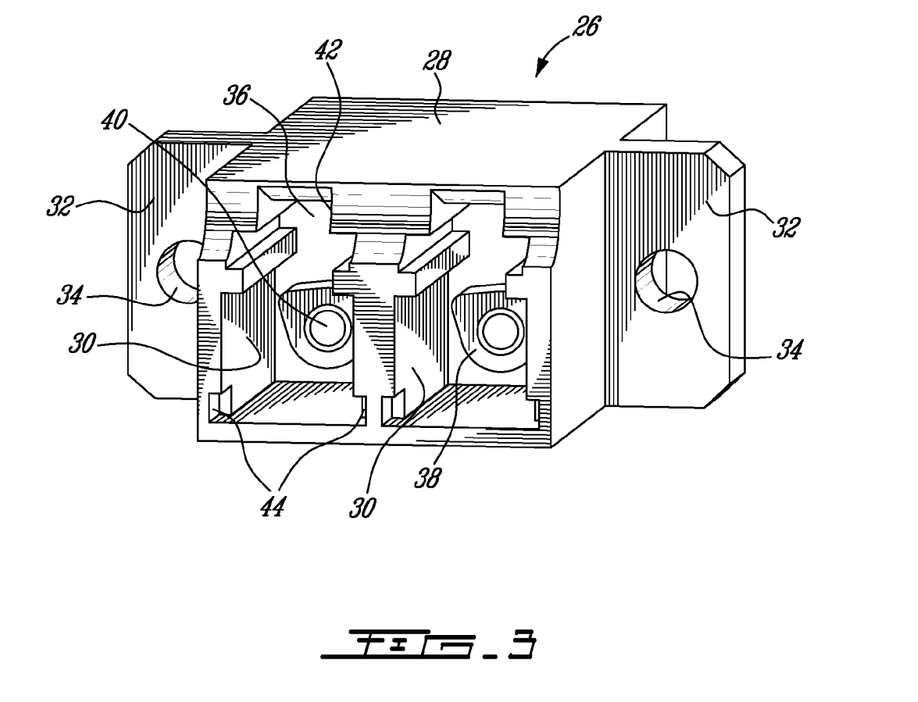
FIG. 3 is an orthogonal view of a receptacle in accordance with an illustrative embodiment of the present invention.

Referring now to FIG. 3, a receptacle in accordance with an illustrative embodiment of the present invention will be described. The receptacle, generally referenced using the numeral 26, illustratively comprises a receptacle housing 28 fabricated from a non-conductive material such as glass filled thermoplastic into which are moulded one or more receptacle sockets 30. Referring to FIG. 1 in addition to FIG. 3, the sockets 30 are dimensioned for receiving the forward end 10 of the plug housing 6 which is held snugly therein. Note that, although in the present illustrative embodiment a receptacle 26 having a duplex configuration with two (2) sockets 30 is disclosed, the receptacle 26 could also be simplex with a single socket 30, or provide for three (3) or more sockets 30.

Referring back to FIG. 3, the receptacle housing 28 can be fastened to a patch bay panel or the like (not shown) by means of a pair of integrated flanges 32 and/or by screws or similar fasteners inserted through the cut outs 34 in the flanges.

Each receptacle socket 30 is terminated by a rear wall 36 and onto which is moulded a raised boss 38, illustratively of an oval or egg shape, having a circular ferrule accepting bore 40 therein. Also moulded into the socket 30 is a reciprocal locking mechanism 42 which, referring to FIG. 1 in addition to FIG. 3, mates with the latch 16, thereby securely interlocking the connector 2 with the receptacle 26 when the connector plug housing 6 is completely inserted into the socket 30. A pair of indentations 44 are also moulded in the socket 30 which mate with the corresponding tabs 20 moulded into the connector plug housing 6. The tabs 20 prevent a connector 2 from being completely inserted into a receptacle 26 which does not have these indentations. Note that in an alternative embodiment both the tabs 20 and indentations 44 could be absent without otherwise affecting the present invention.

Figure 4:
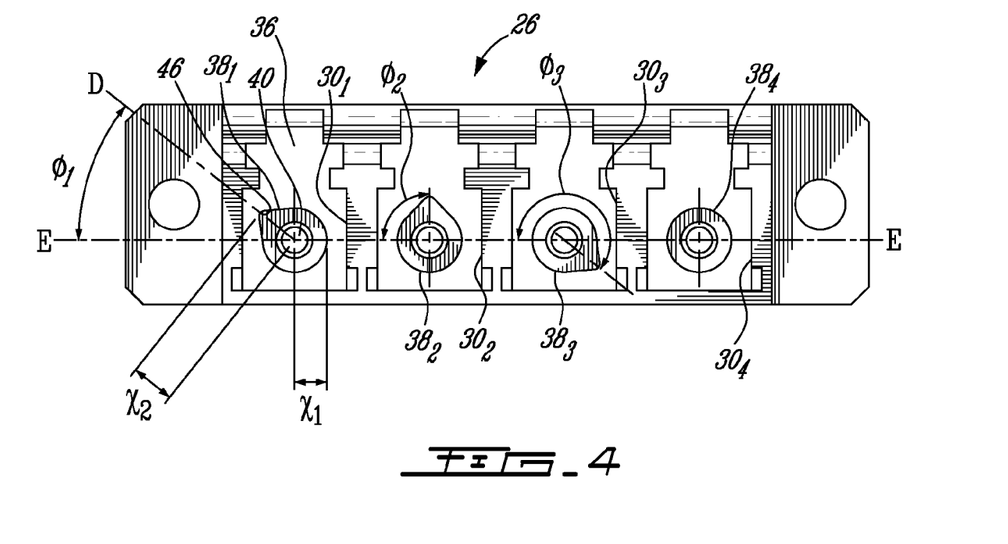
FIG. 4 is a front plan view of a receptacle in accordance with an illustrative embodiment of the present invention.

Referring now to FIG. 4, each socket 30 is configured to one of a plurality of predefined receptacle keying geometries. Illustratively, the receptacle keying geometry is provided by a raised boss 38 having a boss keying geometry, mounted on the rear wall 36 of the socket 30 comprising an oval or egg shaped cross section having a first generally circular concentric portion of radius $x_1$ and a keying portion 46 projecting a distance of $x_2$ from the centre of the ferrule cavity 40, $x_2$ being illustratively greater than radius $x_1$, although in a given implementation the distance of $x_2$ could also be smaller than $x_1$. The boss keying portion 46 is illustratively symmetric about an axis such as D, with axis D at a predetermined receptacle keying angle $\phi_1$ from the horizontal plane E.

Referring to FIG. 2 in addition to FIG. 4, in order for a connector 2 to correctly mate with a receptacle 26, the keying angles θ and φ as well as the lengths $X_1$, $X_2$ and $x_1$, $x_2$ must match such that the cross section of the raised boss 38 is the mirror image of the cross section of the cavity 14 and that the cavity 14 fits snugly over the raised boss 38. For example, in the illustrative embodiment if the keying angles θ and φ do not match, then a portion of the front surface 10 of the connector plug housing 6 will butt against the boss keying portion 46 of the raised boss 38 thereby preventing the connector 2 from being correctly inserted into the receptacle 26.

It is foreseen that a combination of eight (8) keying angles θ and φ equally distributed around 360° (for example 0°, 45°, 90°, 135°, 180°, 225°, 270°, 315°) will provide adequate keying for most applications, although it will be understood that this could easily be extended to sixteen (16) or even greater with precision manufacturing of the connector 2 and receptacle 26. Referring back to FIG. 4, it is also foreseen that receptacles 26 can have multiple sockets $30_1$, $30_2$, $30_3$ each socket $30_1$, $30_2$, $30_3$ having a raised boss $38_1$, $38_2$, $38_3$ with differing keying angles $\phi_1$, $\phi_2$, $\phi_3$. It will be understood that although a receptacle 26 is shown with three raised bosses $38_1$, $38_2$, $38_3$, and three keying angles $\phi_1$, $\phi_2$, $\phi_3$ a receptacle 26 could easily be manufactured having many sockets 30, each socket 30 having a corresponding raised boss 38 and keying angle φ in any one of a number of combinations. It should also be understood that multiple connectors 2 with different connector keying angles θ can also be bundled together into a multiple connector assembly (not shown). It should also be understood that sockets such as $30_4$ may be included with raised bosses such as $38_4$ which are circular in cross section without the inclusion of a receptacle keying portion, thereby allowing conventional non-keyed connectors to be inserted into the receptacle 26.

Note that, although the above illustrative embodiment has been described with the cavity 14 being moulded or machined into the forward end 10 of the plug housing 6 and the raised boss 38 being located within the receptacle socket 30, a person of ordinary skill in the art would understand that, with appropriate modifications, the cavity 14 could be moulded or otherwise formed into the receptacle socket 30 and the boss formed in the forward end 10 of the plug housing 6.

Of note is that the present system can be designed for use as a one way system or a two way system. A one way system being defined as a system where keyed connectors can only be connected with a keyed receptacle and a two way system is defined as a system where keyed connectors are backward compatible with legacy system receptacles (or vice versa), allowing for example, keyed connectors to be used with existing receptacles.

Referring to FIG. 4, for example, in an illustrative embodiment of a two way system using existing circular legacy bosses as in $38_4$ is disclosed. These legacy bosses $38_4$ allow for the plug housing 6 of a connector 2 to be correctly inserted into the socket $30_4$ regardless of the connector keying angle θ (provided, of course, the length $X_1$ of FIG. 2 is less than the length $X_2$ and corresponds to the radius of the legacy boss $30_4$).

Figure 5A:
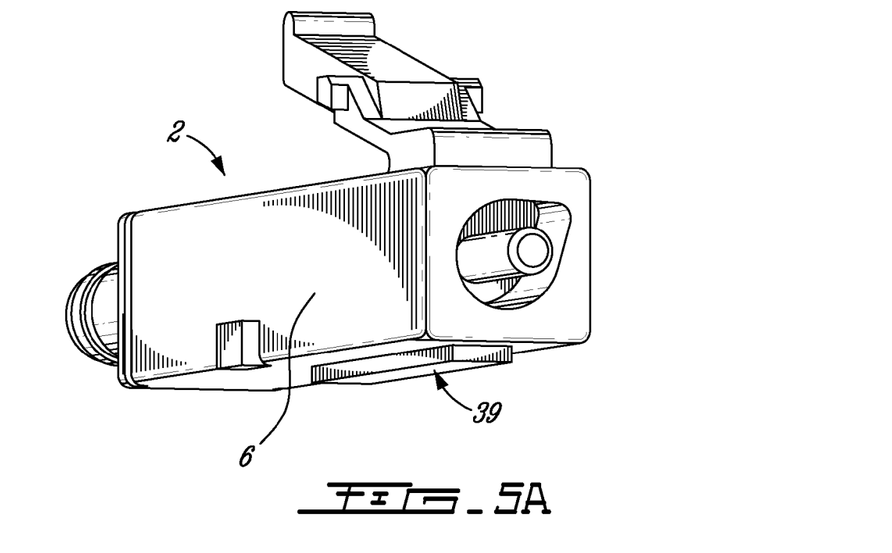
FIG. 5A is an orthogonal view of a connector in accordance with an alternative illustrative embodiment of the present invention.
Figure 5B:
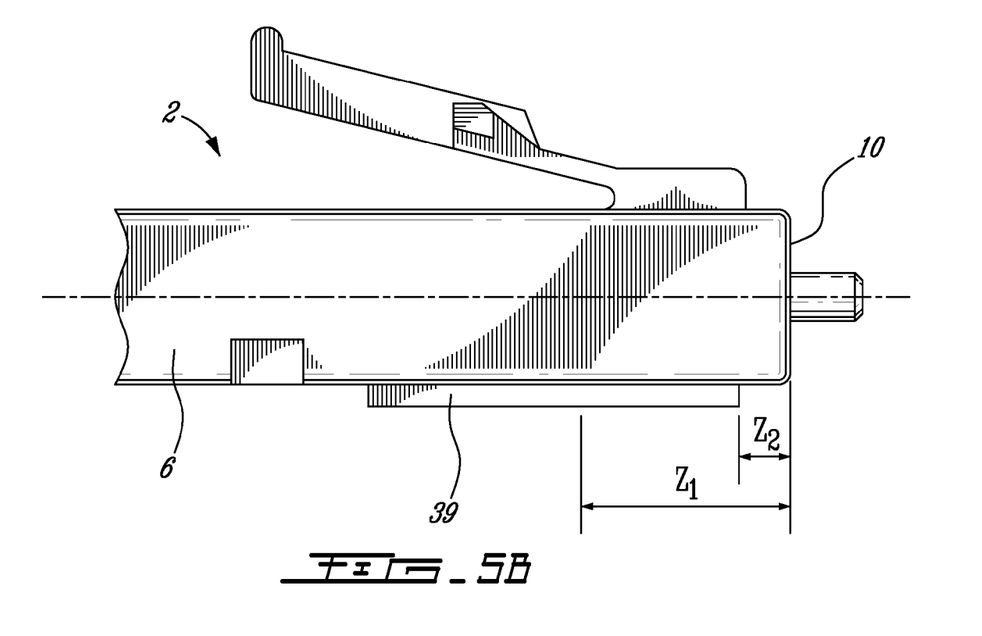
FIG. 5B is a side plan view of a connector in accordance with an alternative illustrative embodiment of the present invention.

Referring to FIG. 5A in addition to FIG. 4, an illustrative embodiment of a one way system is disclosed. In order to stop a keyed connector 2 from being inserted into a socket such as socket $30_4$, a tab 39 could be moulded into or otherwise attached to the outside of the plug housing 6. Referring to FIG. 5B, as known in the art, existing LC type behind the wall (BTW) connectors and receptacles include such an assembly. However, the tabs of these prior art connectors extend only partially along the plug housing 6 and stop at a position $Z_1$ well short of the forward end 10 of the plug housing 6. By extending the tab 39 such that it stops at a position $Z_2$ closer to the forward end 10 of the plug housing 6, the plug housing 6 can also be prevented from being fully inserted into legacy LC receptacles. In order for such a connector 2 to be correctly inserted into a receptacle 26, the socket 30 will have to be modified to include a notch within which the tab 39 fits. It will be apparent now to a person of ordinary skill in the art that, in the absence of a receiving groove in the receptacle (all not shown) for the tab 39, or a groove of the correct depth, the tab 39 would butt against the receptacle housing thereby preventing the user from inserting the plug housing 6 completely into the socket 30.

It is also foreseen that the plug housings 6 and the sockets 30 be colour coded, with a given colour corresponding to a given pair of keying angles θ, φ, in order to aid the user in determining which connector 2 belongs in which socket 30. Additionally, other coding means such as symbols, alphanumeric characters, etc., may be used alone or in combination with colours to provide a variety of means for distinguishing keyed connectors and receptacle sockets from one another.

Figure 6:
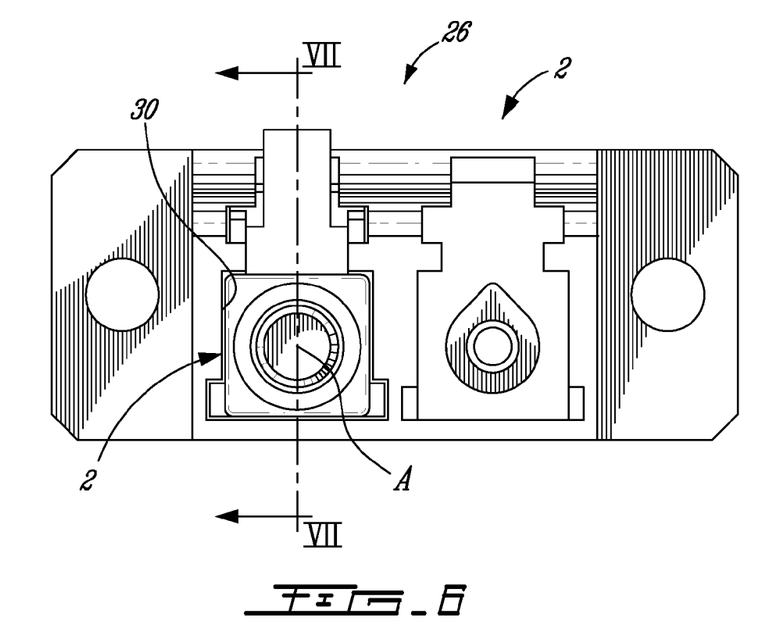
FIG. 6 is a front plan view of a receptacle with a connector installed in a socket thereof in accordance with an illustrative embodiment of the present invention.
Figure 7:
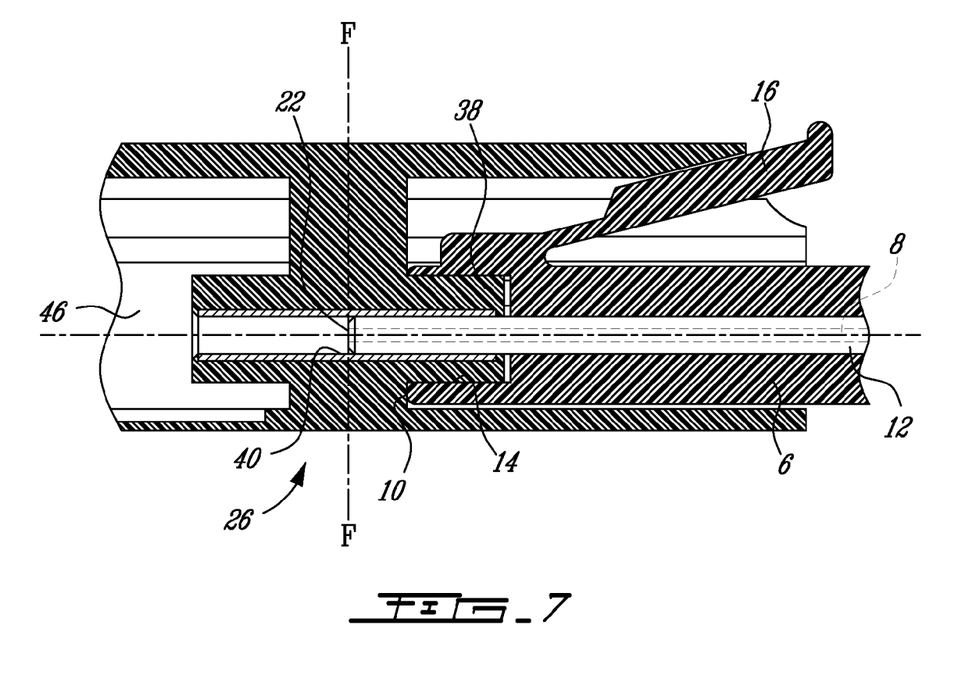
FIG. 7 is a side cut away view along VII-VII in FIG. 6.

Referring now to FIG. 6, a connector 2 inserted into the first socket 30 of a duplex receptacle 26 is shown. Referring to FIG. 7 in addition to FIG. 6, and assuming that the keying angles θ, φ are a matched pair, on insertion the forward end 10 of the plug housing 6 butts against the rear wall 36 of the socket 30. At this point the latch 16 is engaged by the reciprocal locking mechanism 42 thereby holding the plug housing 6 securely in the socket 30. Simultaneously, the ferrule 12 containing the optic fibre is inserted into the ferrule accepting bore 40 and the raised boss 38 is encircled by the cavity 14, with the exposed end 22 of the optic fibre 8 being substantially in alignment with reference plane F. Insertion of a second connector (not shown) into a similar socket 46 moulded into the rearward side of the receptacle 26 and in back-to-back relationship with the socket 30 would have the effect bringing the exposed end of the second connector's optic fibre into close contact with the exposed end 22 of the optic fibre 8, with the optic fibres being substantially axially aligned, and thereby allowing light propagating in one of the optic fibres to be transferred to the other. Typically (although not necessarily), sockets as in 30, 46 in back-to-back relationship would have the same predefined receptacle keying geometries to ensure that fibre optic cables having compatible connector keying geometries could be interconnected.

The connector 2 can be readily removed from the receptacle 26 by depressing the latch 16, thereby releasing the reciprocal locking mechanism 42.

Figure 8:
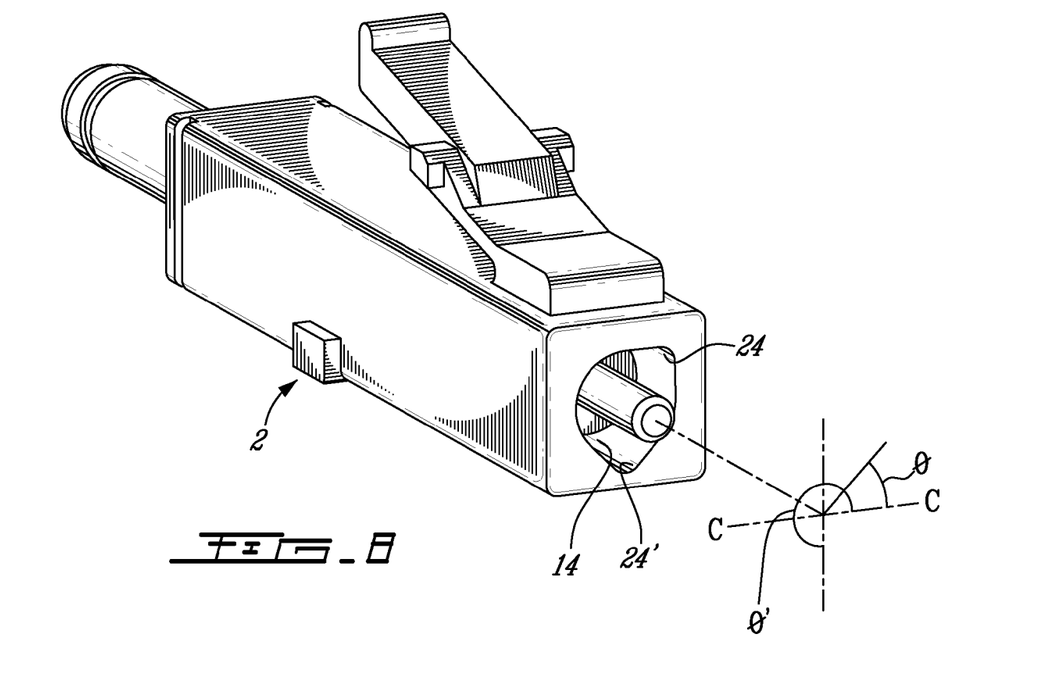
FIG. 8 is an orthogonal view of a connector in accordance with an alternative illustrative embodiment of the present invention.

Referring to FIG. 8, a connector 2 in accordance with an alternative illustrative embodiment of the present invention is disclosed. In this embodiment the cavity 14 includes two connector keying portions 24, 24' corresponding to two different connector keying angles θ, θ'. In this manner, connectors 2 can be provided which mate with the sockets having receptacle keying portions with different keying angles φ, provided, of course, that the receptacle keying angle φ matches with one of the connector keying angles θ, θ'. It will now be apparent to a person of ordinary skill in the art that the number of connector keying portions 24 at a variety of keying angles θ could be increased to provided for a variety of keying situations.

Figure 9:
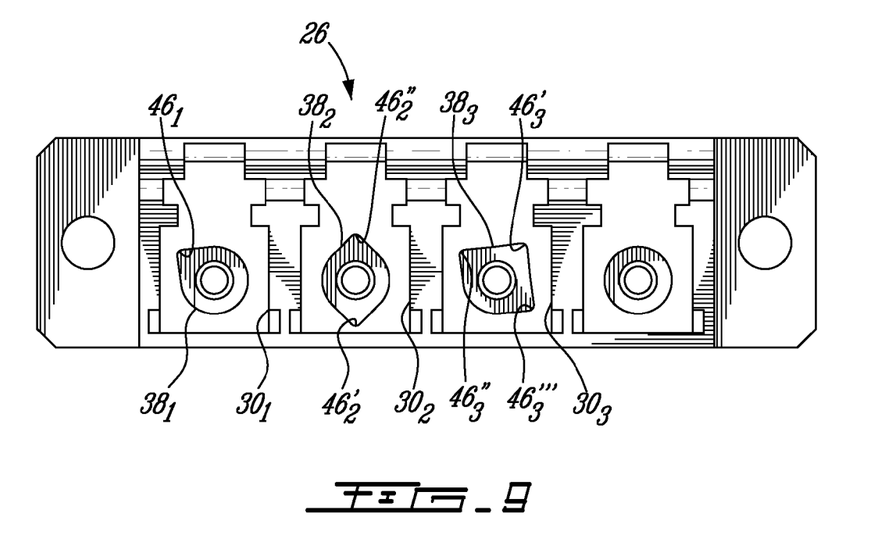
FIG. 9 is a front plan view of a receptacle in accordance with an alternative illustrative embodiment of the present invention.

Referring to FIG. 9 in addition to FIG. 8, receptacles 26 having sockets $30_1$, $30_2$, $30_3$ with raised bosses $38_1$, $38_2$, $38_3$ are disclosed. Raised bosses $38_2$, $38_3$ are depicted as having multiple receptacle keying portions (respectively) $46_2'$, $46_2''$ and $46_3'$, $46_3''$, $46_3'''$. When combined with a corresponding set of connectors 2 having multiple connector keying portions 24, 24', etc., this allows for a wide variation in the number of potential keys which can be used in a given implementation.

Figure 10:
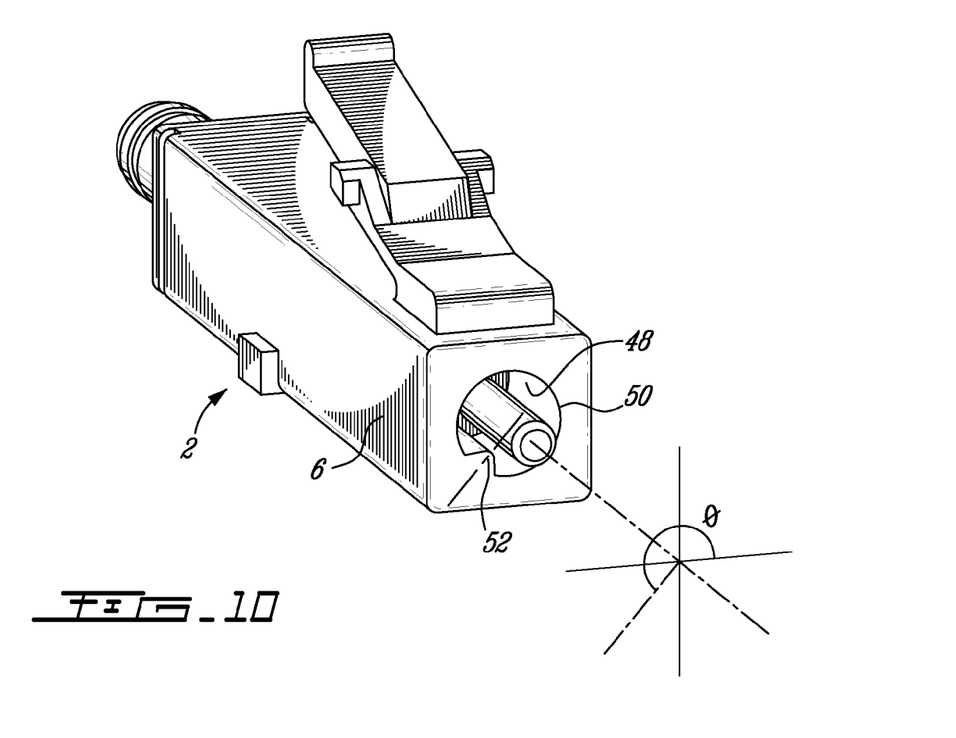
FIG. 10 is an orthogonal view of a connector in accordance with a second alternative illustrative embodiment of the present invention.
Figure 11:
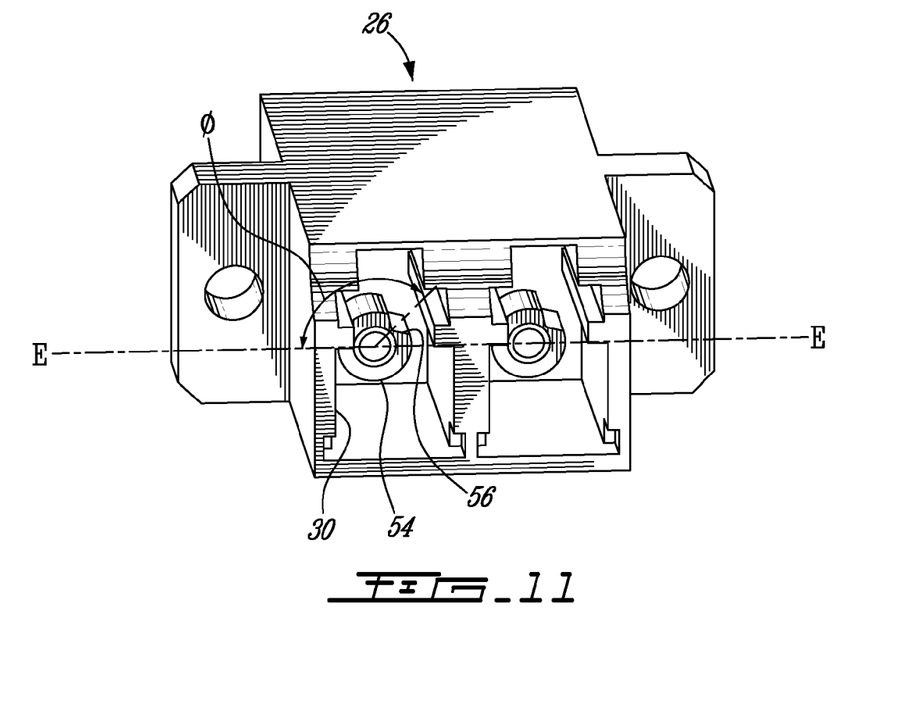
FIG. 11 is an orthogonal view of a receptacle in accordance with an second alternative illustrative embodiment of the present invention.

Referring now to FIG. 10, a connector 2 in accordance with a second alternative embodiment is disclosed including a plug housing 6 having a cavity 48 therein, with the cavity 48 machined or moulded to comprise a generally circular section 50 and a protuberance 52 such as a ridge, tab or the like running axially along the inside of the cavity 48. Similar to the keying system as discussed hereinabove, the protuberance 52 is positioned along the inside of the cavity at the requisite keying angle θ. Referring now to FIG. 11 in addition to FIG. 10, a receptacle 26 comprised of one or more sockets 30 having raised bosses 54 is shown. The raised bosses 54 are moulded or machined to include an indentation 56, for example such as a notch, slot or flute, therein. Similar to the ridge 52, the indentation 56 is positioned on the raised boss 54 at a requisite keying angle φ.

It should be understood that although the protuberance 52 and corresponding indentation 56 have been portrayed as being symmetrically concave in cross section, other shapes of cross sections, for example a square or triangular notch, could also be applied in the context of the present invention. Additionally, the shapes could be asymmetric.

Figure 12:
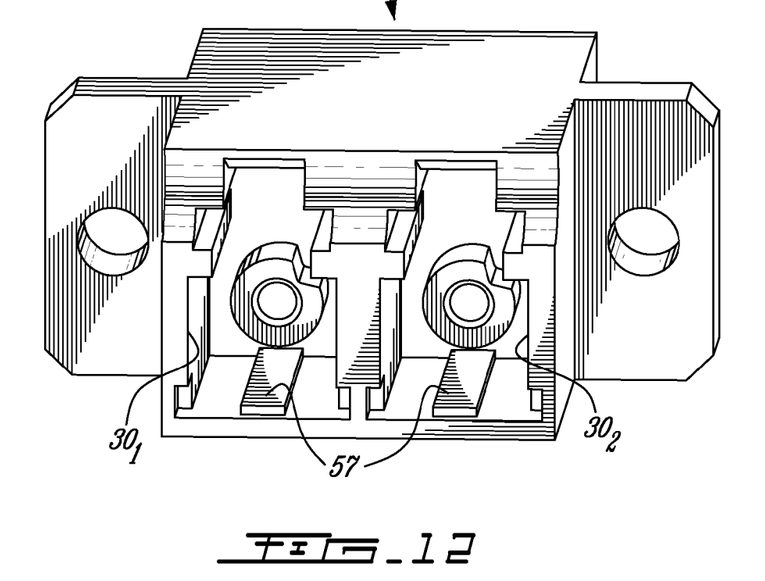
FIG. 12 is an orthogonal view of a receptacle in accordance with an alternative illustrative embodiment of the present invention.

Referring now to FIG. 12 in addition to FIG. 11, in order to prevent a standard connector cable (not shown) from being inserted into a socket 30 keyed by a raised boss 54 having an indentation 56 therein, tabs 57 can be moulded or otherwise bonded to the inside of the sockets $30_1$, $30_2$ in the receptacle 26. In order for a connector to be inserted into a given socket $30_1$ or $30_2$ it will be necessary that the connector plug housing (not shown) be modified to include a suitable notch therein for reception of the tab 57.

Figure 13:
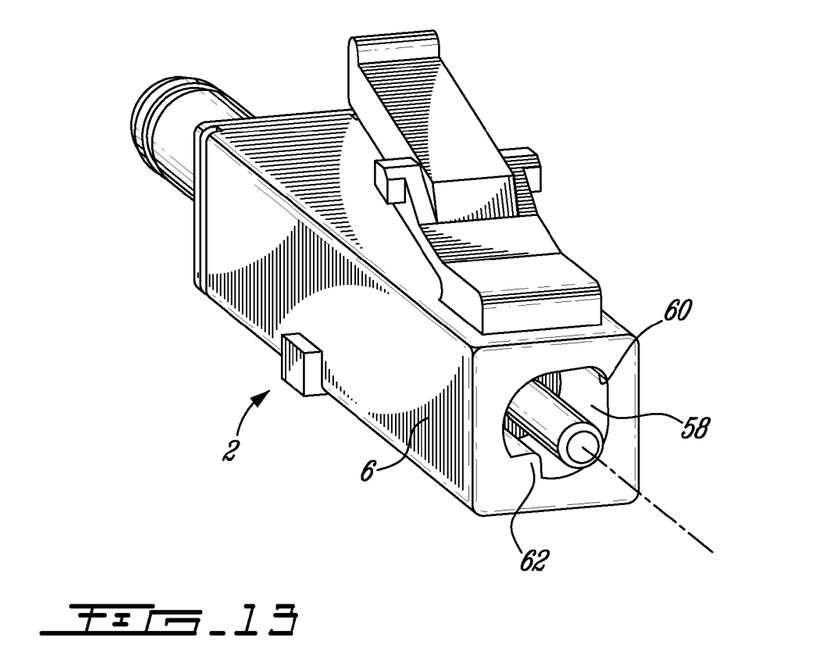
FIG. 13 is an orthogonal view of a connector in accordance with a third alternative illustrative embodiment of the present invention.

Referring to FIG. 13, a connector 2 in accordance with a third alternative illustrative embodiment of the present invention is disclosed. In this embodiment the plug housing 6 is machined or moulded to include a cavity 58 therein having both an indentation 60 and a protuberance 62 therein. The indentation 60 and a protuberance 62 are positioned within the cavity 58 at requisite keying angles as discussed hereinabove. Such a connector 2 would mate with a receptacle having a socket therein with a raised boss including both an indentation and a protuberance located at keying angles (all not shown) matching the keying angles of the indentation 60 and the protuberance 62 of the connector 2.

Figure 14:
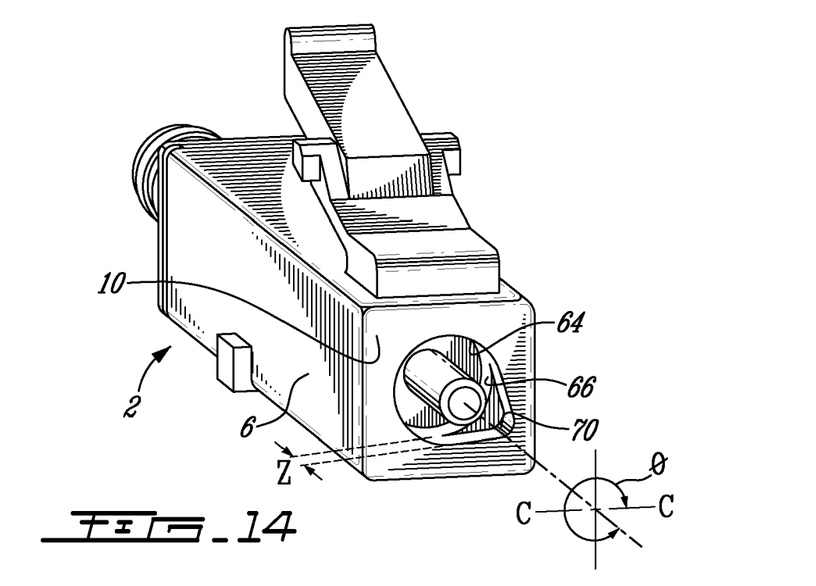
FIG. 14 is an orthogonal view of a connector in accordance with a forth alternative illustrative embodiment of the present invention.

Referring to FIG. 14, a connector 2 in accordance with a forth alternative illustrative embodiment of the present invention is disclosed. In this embodiment the plug housing 6 is machined or moulded to include a cavity 64 having a cross section which varies depending on the depth of the cavity 64. Illustratively, the cavity 64 is comprised of an inner aligning portion 66, illustratively cylindrical, and an outer portion 68 having an illustratively oval or egg shaped cross section with a depth Z and a keying portion 70. In line with the keyed connectors as already disclosed hereinabove, the keying portion 70 is positioned at a predetermined keying angle θ from the horizontal axis C.

Figure 15:
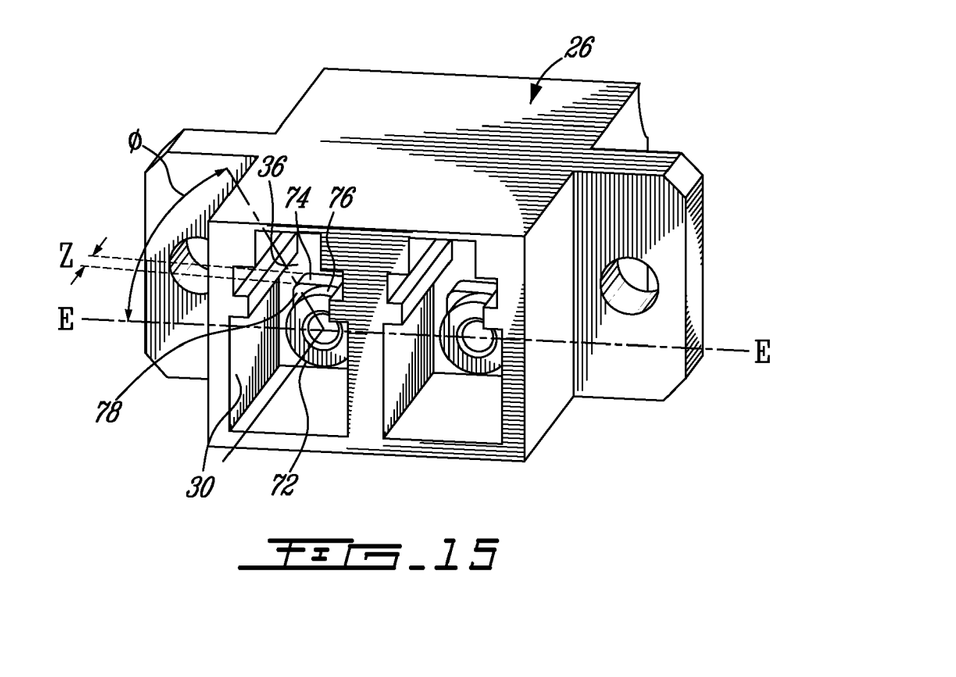
FIG. 15 is an orthogonal view of a receptacle in accordance with a forth alternative illustrative embodiment of the present invention.

Referring to FIG. 15 in addition to FIG. 14, the corresponding receptacle 26 is comprised of one or more sockets 30 having a raised boss 72 machined, moulded or other wise formed into a rear wall 36 thereof. The raised boss 72 is comprised of a lower portion 74 having an illustratively oval or egg shaped cross section and an upper aligning portion 76, illustratively cylindrical. Additionally, the lower portion 74 has a protruding keying portion 78 which is positioned at a predetermined keying angle φ from the horizontal axis E. As will now be apparent to a person of ordinary skill in the art, provided the keying angles θ, φ match, in order for the connector 2 to be inserted completely into the receptacle socket 30, the thickness Z of the lower portion 74 of the raised boss 72 must be the same or less than the depth Z of the upper portion 66 of the cavity 64.

Still referring to FIGS. 14 and 15, provided the keying angles θ, φ match and the thickness Z is the same as or less than the depth Z, when the plug housing 6 is inserted into the socket 30 of the receptacle 26, the cavity 64 will mate with the raised boss 72, thereby allowing the connector 2 to be securely fastened to the receptacle. If the keying angles θ, φ do not match, then illustratively the forward end 10 of the plug housing 6 will butt against the protruding keying portion 78 of the raised boss 72 thereby preventing correct insertion of the plug housing 6 in the socket 30. Similarly, if the thickness z is somewhat greater than the depth z then plug housing 6 will be prevented from being completely inserted into the socket 30, thereby preventing the flexible locking tab or latch 16 from being engaged.

Figure 16:
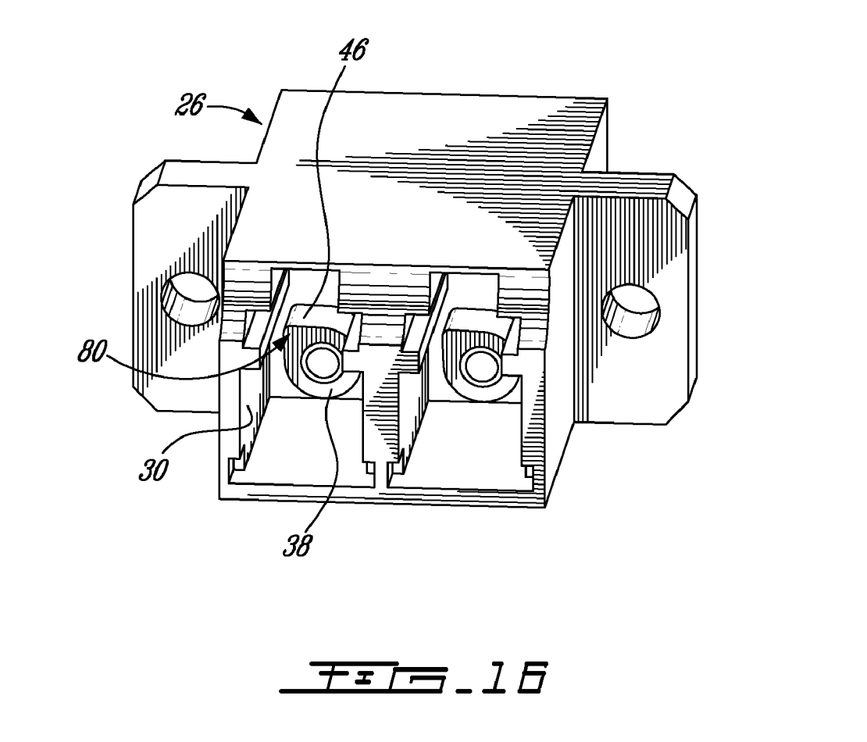
FIG. 16 is an orthogonal view of a receptacle in accordance with a fifth alternative illustrative embodiment of the present invention.
Figure 17:
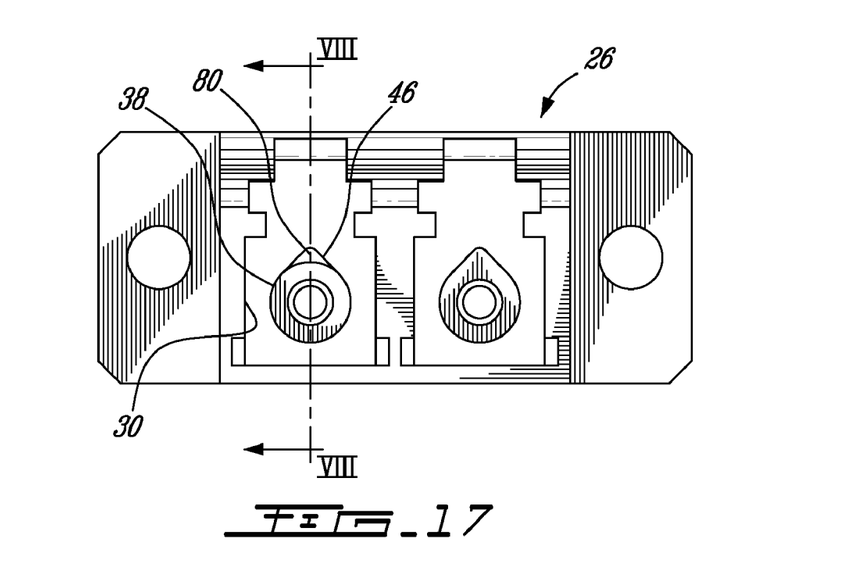
FIG. 17 is a front plan view of a receptacle in accordance with a fifth alternative illustrative embodiment of the present invention.
Figure 18:
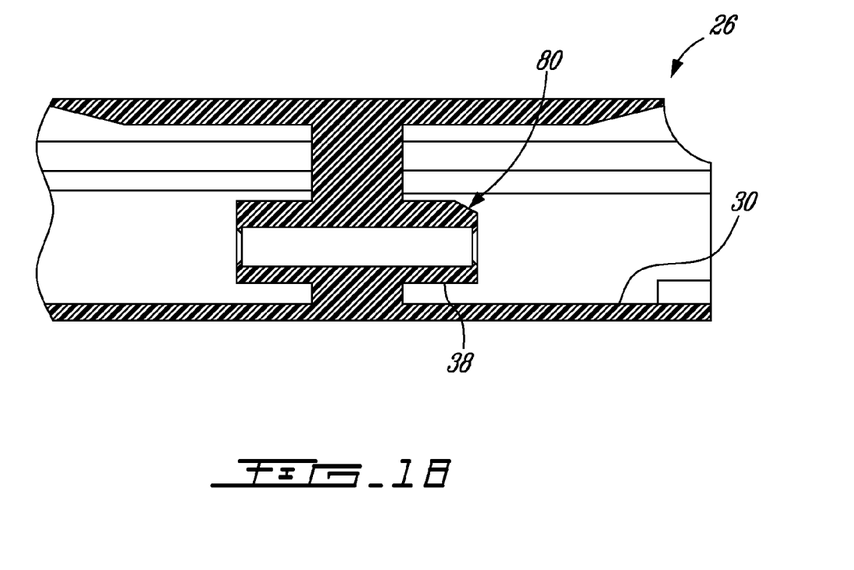
FIG. 18 is a side cut away view along XVIII in FIG. 17 of a receptacle in accordance with a fifth alternative illustrative embodiment of the present invention.

Referring now to FIGS. 16, 17 and 18, a receptacle 26 in accordance with a fifth alternative embodiment of the present invention will be disclosed. The receptacle 26 is similar as to described hereinabove with the difference that the receptacle keying portion 46 of the raised boss includes a bevelled or chamfered outer surface 80 in order to facilitate insertion of a connector (not shown) into the socket 30. Other types of surfaces, for example rounded, could also be implemented in order to facilitate insertion of a connector.

Figure 19A:
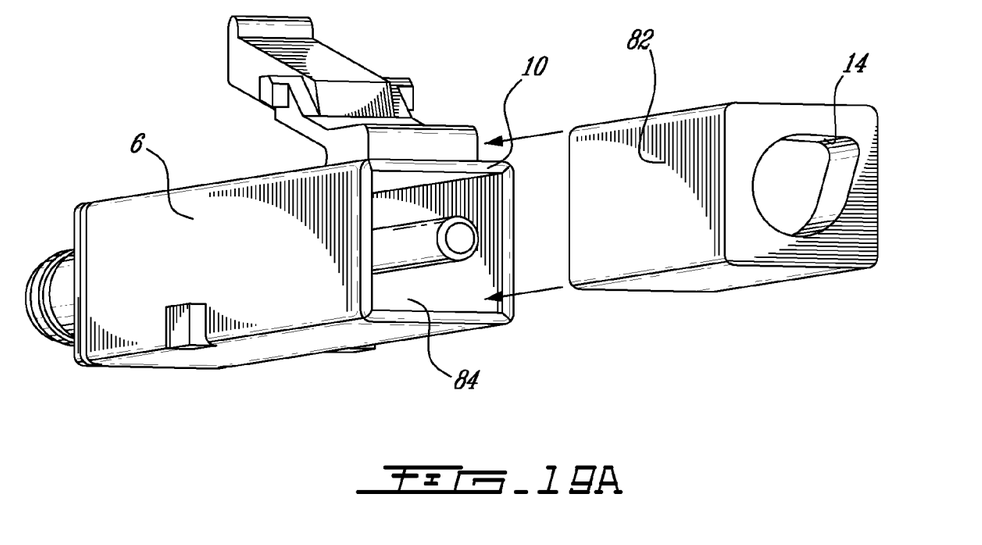
FIG. 19A is an orthogonal view of an illustrative embodiment of an installer modifiable connector keying system.

It is also foreseen that the present keying system be field configurable by the installer in order to provide connectors and receptacles with an installer selected keying. Referring to FIG. 19A, for example, the cavity 14 would be provided in an interchangeable module 82 for insertion into a suitably adapted receiving cut out 84 in the forward end 10 of the plug housing 6. The module 82 would be held in place within the plug housing by clips, an adhesive or other suitable securing means.

Figure 19B:
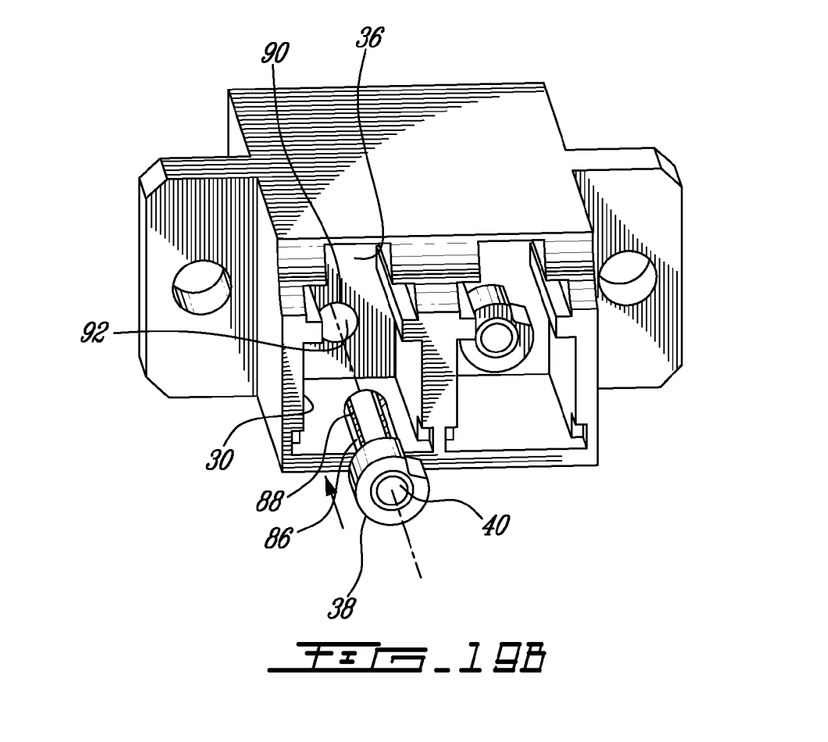
FIG. 19B is a front orthogonal view of a second illustrative embodiment of an installer modifiable connector keying system.

Referring to FIG. 19B, alternatively the raised bosses 38 could be manufactured separately from the receptacle 26 and including a shaft 86 having a second geometry, for example a regular geometric form, such as a triangle, square, hexagon, octagon or the like, a series of grooves 88 therein. The shaft 86 would be rotated to the requisite receptacle keying angle and inserted in a shaft receiving opening 90 having a first geometry in the rear wall 36 of each socket 30 until the raised boss is in contact with the rear wall 36. The shaft receiving opening 90 could include, for example, a ridged inner surface 92 adapted to mate with the series of grooves 88 on the shaft 86. The shaft 86 could also be held in place within the shaft receiving opening 90 by an adhesive, for example.

Alternatively, the cavities and raised bosses of the invention could be modifiable and adaptable through removal from or addition to the cavities or raised bosses through the provision of a suitable tool (for example by cutting away a portion of a raised boss or fluting the inside of a cavity).

Figure 20:
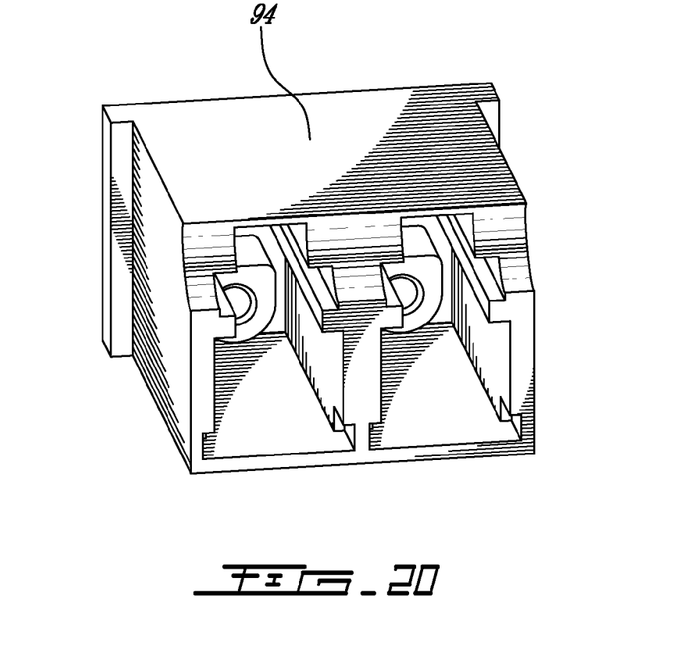
FIG. 20 is a front orthogonal view of a receptacle for mounting on active devices in accordance with an illustrative embodiment of the present invention.

Referring to FIG. 20, although the above invention has been described using BTW receptacles for interconnecting two connectors, the keying system could also be moulded into single sided receptacles 94 for mounting on active components, attenuators and the like (not shown).

Although the present invention has been described hereinabove by way of an illustrative embodiment thereof, this embodiment can be modified at will without departing from the spirit and nature of the subject invention.

What is claimed is:

1. A system for providing selective interconnection between a first optic fibre and a second optic fibre, the system comprising:
    a set of receptacles, each receptacle comprising a pair of back-to-back receptacle sockets, each of said sockets conforming substantially to a standard and each socket in said pair of back-to-back receptacle sockets comprising a receptacle keying part configured to a same one of a plurality of predefined receptacle keying geometries, said receptacle keying part for each receptacle in said set of receptacles being different;
    a set of connector plugs, each plug in said set of plugs conforming substantially to said standard and adapted for insertion into a first of said back-to-back receptacle sockets, said each plug comprising a connector keying part configured to one of a plurality of predefined connector keying geometries, said connector keying part for each plug in said set of connector plugs being different;
    a first connector plug terminating the first optic fibre and a second connector plug terminating the second optic fibre, each of said first plug and said second plug selected from said set of connector plugs and conforming substantially to said standard, said plug comprising a connector keying part configured to one of a plurality of predefined connector keying geometries; and
    wherein one and only one of said predefined connector keying geometries corresponds to one and only one of said predefined receptacle keying geometries; and
    wherein when said receptacle keying geometry of said receptacle keying part of said first socket corresponds to a connector keying geometry of a connector keying part of said first plug and said receptacle keying geometry of said receptacle keying part of said second receptacle socket corresponds to a connector keying geometry of a connector keying part of said second plug, said first plug can be inserted in said first socket and said second plug can be inserted in said second socket bringing the first optic fibre into axial alignment with the second optic fibre.

2. The system of claim 1, wherein each of said connector plugs in said set of connector plugs comprises a cavity formed in a forward end thereof configured to one of said plurality of predefined connector keying geometries and a ferrule for stabilising a respective one of said optic fibres and each of said sockets comprises a raised ferrule receiving boss disposed on a rear wall thereof and configured to one of said plurality of predefined receptacle keying geometries, said boss comprising an opening adapted to receive one of said ferrules therein when said boss is inserted into said cavity, said openings defining a passageway there between.

3. The system of claim 2, wherein each of said ferrules is coaxial with their respective cavities and said openings are coaxial with said bosses.

4. The system of claim 1, wherein when said connector plugs are inserted into their respective sockets, an exposed end of the first optic fibre and an exposed end of the second optic fibre are brought substantially into contact.

5. The system of claim 4, wherein at least one of said exposed ends is moveable within its respective connector plug in a direction of insertion from a normally forward position, and wherein when said connector plugs are inserted into their respective sockets, the exposed ends come into contact, thereby forcing the at least one moveable exposed ends away from said normally forward position while maintaining said exposed ends in contact.

6. The system of claim 5, wherein the moveable exposed end is biased normally forward by a spring arranged coaxially with the optic fibre.

7. A set of receptacles for providing selective interconnection between first and second fibre optic cables, each cable comprising a connector plug conforming substantially to a standard and comprising a connector keying part having a same one of a plurality of predefined connector keying geometries, said set of receptacles comprising:
    a plurality of receptacles, each of said receptacles comprising a pair of back-to-back receptacle sockets, each of said sockets in each of said pair conforming substantially to the standard and wherein for each of said plurality of receptacles both of said pair of sockets comprises a receptacle keying part having a shape corresponding to a unique one of a plurality of predefined receptacle keying geometries;

wherein each of the connector keying geometries corresponds to one of said predefined receptacle keying geometries; and wherein when a receptacle keying geometry of said receptacle keying part of a first of said back-to-back receptacle sockets corresponds to a connector keying geometry of the connector keying part of the connector plug of the first cable and when a receptacle keying geometry of said receptacle keying part of a second of said back-to-back receptacle socket corresponds to a connector keying geometry of the connector keying part of the connector plug of the second cable, the connector plug of the first cable can be inserted in said first socket and the connector plug of the second cable can be inserted in said second socket, thereby interconnecting the first and second cables.

8. The set of receptacles of claim 7, wherein the fibre optic cables each comprise an optic fibre and said receptacle further comprises a passageway between said first and second back-to-back sockets and into which the optic fibres are inserted.

9. The set of receptacles of claim 7, wherein each of said connector plugs further comprises a ferrule for stabilising a respective one of said optic fibres, each of said sockets comprises a raised ferrule receiving boss disposed on a rear wall thereof and configured to one of said plurality of predefined receptacle keying geometries, each of said plugs comprises a cavity formed in a forward end thereof configured to one of said plurality of predefined connector keying geometries and each of said bosses further comprises an opening adapted to receive one of said ferrules therein when said boss is inserted into said cavity, said openings defining a passageway there between.

10. The set of receptacles of claim 7, wherein each of said sockets comprises a raised boss disposed therein and configured to one of said plurality of predefined receptacle keying geometries and each of the connector plugs comprises a cavity formed in a forward end thereof configured to one of the plurality of predefined connector keying geometries.

11. A system for providing interconnection between a first optic fibre and a second optic fibre, the system comprising:
    a set of receptacles, each receptacle in said set comprising a pair of back-to-back receptacle sockets, each of said sockets conforming substantially to a standard and wherein for each of said plurality of receptacles, a first of said sockets in said pair of back-to-back receptacle sockets comprises a receptacle keying part configured to a unique one of a plurality of predefined receptacle keying geometries; and
    a first connector plug terminating the first optic fibre, said plug adapted for insertion into said first socket, said plug comprising a connector keying part configured to one of a plurality of predefined connector keying geometries; and
    a second connector plug terminating the second optic fibre, said plug inserted into a second of said back-to-back receptacle sockets; and
    wherein at least one of said predefined connector keying geometries matches at least one of said predefined receptacle keying geometries; and wherein when a receptacle keying geometry of said keying part of said first receptacle socket corresponds to said connector keying geometry of said keying part of said first plug, said first plug can be inserted in said first socket bringing said first optic fibre into axial alignment with said second optic fibre.

12. The system of claim 11, wherein said first socket comprises a first raised ferrule receiving boss disposed on a rear wall thereof and configured to one of said plurality of predefined receptacle keying geometries and said first plug comprises a first cavity formed in a forward end thereof configured to one of said plurality of predefined connector keying geometries and said second socket comprises a second raised ferrule receiving boss disposed on a rear wall thereof and said second plug comprises a cavity formed in a forward end thereof.

13. The system of claim 11, wherein when said connector plugs are inserted into their respective sockets, an exposed end of the first optic fibre and an exposed end of the second optic fibre are brought substantially into contact.

14. The system of claim 13, wherein each of said connector plugs further comprises a ferrule for stabilising a respective one of said optic fibres and each of said bosses further comprises an opening adapted to receive one of said ferrules therein when said boss is inserted into said cavity, said openings defining a passageway there between.

15. The system of claim 14, wherein each of said ferrules is coaxial with their respective cavities and said openings are coaxial with said bosses.

16. A set of receptacles for providing interconnection between first and second fibre optic cables, the first cable comprising a connector plug conforming substantially to a standard and comprising a connector keying part having one of a plurality of predefined connector keying geometries, the set of receptacles comprising:
    a plurality of receptacles, each of said receptacles comprising first and second back-to-back receptacle sockets, each of said sockets conforming substantially to the standard, wherein for each of said plurality of receptacles said first socket comprises a receptacle keying part having a shape corresponding to a unique one of a plurality of predefined receptacle keying geometries;
    wherein each of the connector keying geometries corresponds to one of said predefined receptacle keying geometries; and
    wherein a connector plug of the second cable conforms substantially to the standard and can be inserted into said second receptacle socket; and
    wherein when said receptacle keying geometry of said receptacle keying part corresponds to the connector keying geometry of the connector keying part of the connector plug of the first cable, the connector plug of the first cable can be inserted in said first socket, thereby interconnecting the first and second cables.

17. The set of receptacles of claim 16, wherein the fibre optic cables each comprise an optic fibre and said receptacle further comprises a passageway between said first and second back-to-back sockets and into which the optic fibres are inserted.

* * * * *